(12) United States Patent
Baba (10) Patent No.: US 11,008,259 B2
(45) Date of Patent: May 18, 2021

(54) METHOD FOR MANUFACTURING CERAMIC PLATE-SHAPED BODY AND CERAMIC PLATE-SHAPED BODY

(71) Applicant: Murata Manufacturing Co., Ltd., Nagaokakyo (JP)

(72) Inventor: Akira Baba, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 295 days.

(21) Appl. No.: 15/983,559

(22) Filed: May 18, 2018

(65) Prior Publication Data

US 2018/0339945 A1 Nov. 29, 2018

(30) Foreign Application Priority Data

May 26, 2017 (JP) .............................. JP2017-104717

(51) Int. Cl.
*C04B 35/622* (2006.01)
*C04B 35/634* (2006.01)
(Continued)

(52) U.S. Cl.
CPC ................ *C04B 35/48* (2013.01); *B32B 1/00* (2013.01); *C04B 35/6264* (2013.01);
(Continued)

(58) Field of Classification Search
None
See application file for complete search history.

(56) References Cited

U.S. PATENT DOCUMENTS

2012/0021304 A1 1/2012 Satake et al.
2016/0286658 A1 9/2016 Matsubara

FOREIGN PATENT DOCUMENTS

JP H01270566 A 10/1989
JP 2000169244 A * 6/2000
(Continued)

OTHER PUBLICATIONS

JP 2013-069457 A (Hata) Apr. 2013 (English language machine translation). [online] [retrieved Sep. 23, 2020], Retrieved from: Google Patents. (Year: 2013).*

(Continued)

*Primary Examiner* — Erin Snelting
(74) *Attorney, Agent, or Firm* — Arent Fox LLP (57) ABSTRACT

A method for manufacturing a ceramic plate-shaped body that efficiently manufactures a ceramic plate-shaped body having high smoothness without requiring polishing after firing. The method includes preparing an unsintered plate-shaped body, preparing a plurality of resin sheets by a resin slurry containing a spherical resin powder that is composed of a resin material being poorly-soluble in an organic solvent and burning out during firing, producing an unsintered laminate by laminating and press-bonding the unsintered plate-shaped body and the resin sheet, firing the unsintered laminate so that the unsintered plate-shaped body is sintered to form a ceramic plate-shaped body, and the ceramic plate-shaped bodies are bonded to each other with scattered fine bonding portions interposed therebetween to form a ceramic laminate, and breaking the bonding portions in the ceramic laminate so that the ceramic laminate is divided into a plurality of ceramic plate-shaped bodies.

11 Claims, 4 Drawing Sheets

(51) Int. Cl.
  *C04B 35/638*  (2006.01)
  *C04B 37/00*   (2006.01)
  *C04B 35/48*   (2006.01)
  *C04B 35/64*   (2006.01)
  *B32B 1/00*    (2006.01)
  *C04B 35/626*  (2006.01)

(52) U.S. Cl.
  CPC ...... *C04B 35/62218* (2013.01); *C04B 35/638* (2013.01); *C04B 35/63424* (2013.01); *C04B 35/64* (2013.01); *C04B 37/008* (2013.01); *C04B 2235/3224* (2013.01); *C04B 2235/3246* (2013.01); *C04B 2235/604* (2013.01); *C04B 2235/6025* (2013.01); *C04B 2235/94* (2013.01); *C04B 2235/963* (2013.01); *C04B 2237/348* (2013.01)

(56) References Cited

FOREIGN PATENT DOCUMENTS

| | | | |
|---|---|---|---|
| JP | 2005-289777 A | | 10/2005 |
| JP | 2010251312 A | | 11/2010 |
| JP | 2013069457 A | * | 4/2013 |
| JP | 2013-208876 A | | 10/2013 |
| JP | 2014122411 A | | 7/2014 |
| WO | 2015129340 A1 | | 9/2015 |

OTHER PUBLICATIONS

JP 2000-169244 A (Kawakita) Jun. 2000 (English language machine translation). [online] [retrieved Sep. 23, 2020], Retrieved from: Espacenet. (Year: 2000).*

* cited by examiner

METHOD FOR MANUFACTURING CERAMIC PLATE-SHAPED BODY AND CERAMIC PLATE-SHAPED BODY

CROSS REFERENCE TO RELATED APPLICATIONS

The present application claims priority to Japanese Patent Application No. 2017-104717, filed May 26, 2017, the entire contents of which are incorporated herein by reference.

BACKGROUND

1. Technical Field

The present disclosure relates to a method for manufacturing a ceramic plate-shaped body having a principal surface with high smoothness and a ceramic plate-shaped body having a principal surface with high smoothness.

2. Description of the Related Art

Ceramic plate-shaped bodies are used as constituent members of various electronic components. In order to efficiently manufacture a large number of ceramic plate-shaped bodies, it is preferred that after firing an unsintered laminate in which a large number of unsintered plate-shaped bodies including a ceramic material powder are overlaid to obtain a ceramic laminate, the ceramic laminate is divided into ceramic plate-shaped bodies. Here, the unsintered plate-shaped body is, for example, one ceramic green sheet or a press-bonded product of a plurality off ceramic green sheets.

An example of a method for manufacturing such a ceramic plate-shaped body is described in Japanese Patent Application Laid-Open No. 2005-289777. In the method described therein, an unsintered laminate in which an unsintered plate-shaped body and an organic sheet made of a nonwoven fabric, paper, or another organic material and burned out during firing are alternately overlaid, is produced.

When such an unsintered laminate is fired, a ceramic laminate in which the ceramic plate-shaped bodies are bonded to each other with scattered fine bonding portions interposed therebetween, is obtained. In this case, since bonding strength between the ceramic plate-shaped bodies is small, the ceramic laminate can be easily divided into individual ceramic plate-shaped bodies by applying a slight external force.

In this existing method for manufacturing a ceramic plate-shaped body as described above, it is described that the surface roughness of the principal surface of the unsintered plate-shaped body is set to 1 μm or more and 30 μm or less in the arithmetic average roughness according to JIS B 0601. When such an unsintered plate-shaped body is fired, it is thought that the surface roughness of the principal surface of the obtained ceramic plate-shaped body is reduced by sintering shrinkage to about 0.8 times larger than that of the principal surface of the unsintered plate-shaped body. That is, it is highly probable that the surface roughness of the principal surface of the ceramic plate-shaped body obtained by the above method for manufacturing a ceramic plate-shaped body is equal to or greater than 0.8 μm in arithmetic average roughness.

High smoothness may be required of the principal surface of the ceramic plate-shaped body depending on the application of the ceramic plate-shaped body. However, in the above manufacturing method, there is a possibility that the surface roughness of the principal surface of the obtained ceramic plate-shaped body does not satisfy the requirement. In that case, it is necessary to subsequently polish the principal surface of the ceramic plate-shaped body by some polishing method, which is of course undesirable from the viewpoint of additional labor and cost required in the manufacturing process.

SUMMARY OF THE INVENTION

Thus, it is an object of the present disclose to provide a method for manufacturing a ceramic plate-shaped body that efficiently manufactures a ceramic plate-shaped body having a principal surface with high smoothness without including a polishing step after firing. In addition, it is another object of the present disclosure to provide a ceramic plate-shaped body that is not polished after firing and has a principal surface with high smoothness.

In the method for manufacturing a ceramic plate-shaped body according to the present disclosure, an improvement is made on an organic sheet sandwiched between unsintered plate-shaped bodies.

The exemplary embodiments are first aimed at a method for manufacturing a ceramic plate-shaped body.

Specifically, a first exemplary embodiment of the method for manufacturing a ceramic plate-shaped body does not include a polishing step after firing. The first exemplary embodiment of the method for manufacturing a ceramic plate-shaped body includes the following first to fifth steps.

The first step is a step of producing or preparing a plurality of unsintered plate-shaped bodies containing a ceramic material powder. The second step is a step of producing or preparing a plurality of resin sheets by using a resin slurry containing an organic solvent and a spherical resin powder that is composed of a resin material being poorly-soluble in the organic solvent and burning out during firing, and which has a median diameter of 0.5 μm or more and 10 μm or less. The third step is a step of producing an unsintered laminate by alternately laminating the unsintered plate-shaped body and the resin sheet and press-bonding the unsintered plate-shaped body and the resin sheet.

The fourth step is a step of firing the unsintered laminate so that the plurality of unsintered plate-shaped bodies are sintered to form the plurality of ceramic plate-shaped bodies, and the plurality of the ceramic plate-shaped bodies are bonded to each other with scattered fine bonding portions interposed between the ceramic plate-shaped bodies to form a ceramic laminate. In this step, the plurality of resin sheets are burned out. The fifth step is a step of breaking the above bonding portions in the ceramic laminate so that the ceramic laminate is divided into a plurality of ceramic plate-shaped bodies.

In the above method for manufacturing a ceramic plate-shaped body according to the first embodiment, after the ceramic laminate in which a plurality of ceramic plate-shaped bodies are laminated is produced, it is divided into individual ceramic plate-shaped bodies, and therefore the ceramic plate-shaped bodies can be manufactured efficiently. In this manufacturing method, the concave portions derived from the shape of the resin powder remain on the principal surface of the ceramic plate-shaped body, but since the particle size of the resin powder is within the above range, the arithmetic average roughness of the principal surface of the ceramic plate-shaped body becomes small. Therefore, without performing the polishing step after firing, a ceramic plate-shaped body having a principal surface with high smoothness can be obtained.

In the above method for manufacturing a ceramic plate-shaped body, the execution of the first step and the execution of the second step may be performed in any order.

Moreover, the first exemplary embodiment of the method for manufacturing a ceramic plate-shaped body according to the present disclosure preferably has the following features of the thickness of the resin sheet that is 3 µm or more and 30 µm or less.

In the above method for manufacturing a ceramic plate-shaped body, since the thermal energy necessary for burning out the resin sheet is small, the firing time can be shortened. In addition, since a ratio of the ceramic plate-shaped body contained in the fired ceramic laminate can be increased, the production efficiency of the ceramic plate-shaped body is increased.

The first exemplary embodiment of the method for manufacturing a ceramic plate-shaped body according to the present disclosure and a preferred embodiment thereof are preferably provided with a thickness of the resin sheet that is twice or more a median diameter of the spherical resin powder.

In the above method for manufacturing a ceramic plate-shaped body, since two or more resin powders overlap in the thickness direction of the resin sheet, the bonding area between a plurality of ceramic plate-shaped bodies after firing is greatly reduced. Accordingly, the division of the ceramic laminate into individual ceramic plate-shaped bodies according to the above fifth step is easily performed.

As with the first embodiment, the second exemplary embodiment of the method for manufacturing a ceramic plate-shaped body according to the present disclosure also eliminates the need for a polishing step after firing. In this aspect, the second exemplary embodiment of the method for manufacturing a ceramic plate-shaped body according to the present disclosure includes the following first to fifth steps.

The first step is a step of producing or preparing a plurality of unsintered plate-shaped bodies containing a ceramic material powder. The second step is a step of providing resin layers on one principal surfaces of the plurality of unsintered plate-shaped bodies by using a resin slurry containing an organic solvent and a spherical resin powder that is composed of a resin material being poorly-soluble in the organic solvent and burning out during firing, and which has a median diameter of 0.5 µm or more and 10 µm or less. The third step is a step of producing an unsintered laminate by laminating the plurality of unsintered plate-shaped bodies each having a resin layer provided on one principal surface thereof and press-bonding.

The fourth step is a step of firing the unsintered laminate so that the plurality of unsintered plate-shaped bodies are sintered to form the plurality of ceramic plate-shaped bodies, and the plurality of the ceramic plate-shaped bodies are bonded to each other with scattered fine bonding portions interposed between the ceramic plate-shaped bodies to form a ceramic laminate. In this step, the plurality of resin layers are burned out. The fifth step is a step of breaking the above bonding portions in the ceramic laminate so that the ceramic laminate is divided into a plurality of ceramic plate-shaped bodies.

Also in the above method for manufacturing a ceramic plate-shaped body, after the ceramic laminate in which a plurality of ceramic plate-shaped bodies are laminated is produced, it is divided into individual ceramic plate-shaped bodies, and therefore the ceramic plate-shaped bodies can be manufactured efficiently. Also in this manufacturing method, the concave portions derived from the shape of the resin powder remain on the principal surface of the ceramic plate-shaped body, but since the particle size of the resin powder is within the above-mentioned range, the arithmetic average roughness of the principal surface of the ceramic plate-shaped body becomes small. Therefore, a ceramic plate-shaped body having a principal surface with high smoothness can be obtained without need to perform a polishing step after firing.

The second exemplary embodiment of the method for manufacturing a ceramic plate-shaped body according to the present disclosure preferably has the following features of the thickness of the resin layer being 3 µm or more and 30 µm or less.

In the above method for manufacturing a ceramic plate-shaped body, since the thermal energy necessary for burning out the resin layer is small, the firing time can be shortened. In addition, since a ratio of the ceramic plate-shaped body contained in the fired ceramic laminate can be increased, the production efficiency of the ceramic plate-shaped body is increased.

The second exemplary embodiment of the method for manufacturing a ceramic plate-shaped body according to the present disclosure and a preferred embodiment thereof are preferably provided with a thickness of the resin layer that is twice or more a median diameter of the spherical resin powder.

In the above method for manufacturing a ceramic plate-shaped body, since two or more resin powders overlap in the thickness direction of the resin layer, the bonding area between a plurality of ceramic plate-shaped bodies is greatly reduced. Accordingly, the division of the ceramic laminate into individual ceramic plate-shaped bodies according to the above fifth step is easily performed.

The first and second exemplary embodiments of the method for manufacturing a ceramic plate-shaped body according to the present disclosure, and preferred embodiments thereof preferably have the following features. That is, the unsintered plate-shaped body includes at least one ceramic green sheet. When the unsintered plate-shaped body includes a plurality of ceramic green sheets, the plurality of ceramic green sheets may be simply laminated and may not be press-bonded. In that case, in the second embodiment and the second step of its preferred embodiment, providing of the resin layer may be performed on the uppermost ceramic green sheet included in the unsintered plate-shaped body not press-bonded.

In the method for manufacturing a ceramic plate-shaped body, a thickness of the ceramic plate-shaped body can be appropriately and easily controlled.

The present disclosure also provides for a ceramic plate-shaped body.

In the first embodiment of the ceramic plate-shaped body according to the present disclosure, one principal surface and the other principal surface (i.e., two opposing first and second surfaces) are not polished after firing, and concave portions are scattered on one principal surface and the other principal surface. In the first embodiment of the ceramic plate-shaped body according to the present disclosure, an arithmetic average roughness is 0.023 µm or more and 0.30 µm or less in a region set at an arbitrary position of at least one of the one principal surface and the other principal surface. An arithmetic average depth of the concave portions is 0.022 µm or more and 0.30 µm or less. Further, a thickness of the ceramic plate-shaped body is 30 µm or more and 200 µm or less. Thus, in this aspect, a ceramic plate-shaped body with principal surface is considered to have "high" smoothness with these specific features and dimensions.

The above ceramic plate-shaped body has high smoothness though one principal surface and the other principal surface are not polished after firing. As a result, damage to the ceramic laminate according to the present disclosure is minimized because local concentration of load is suppressed even when stacked or further vibration is applied in that state.

The first exemplary embodiment of the ceramic plate-shaped body according to the present disclosure preferably has the following features. That is, the arithmetic average roughness is 0.1120 µm or more and 0.2190 µm or less in a region set at an arbitrary position of at least one of the one principal surface and the other principal surface. The arithmetic average depth of the concave portions is 0.134 µm or more and 0.241 µm or less.

The above ceramic plate-shaped body has excellent splittability at the time when a ceramic laminate is divided into individual ceramic plate-shaped bodies after the ceramic laminate in which a plurality of ceramic plate-shaped bodies are laminated is produced.

The first exemplary embodiment of the ceramic plate-shaped body according to the present disclosure also preferably has the following features. That is, the arithmetic average roughness is 0.0234 µm or more and 0.0710 µm or less in a region set at an arbitrary position of at least one of the one principal surface and the other principal surface, and an arithmetic average depth of the concave portions is 0.022 µm or more and 0.044 µm or less.

In the ceramic plate-shaped body, the one principal surface and the other principal surface have particularly high smoothness.

As with the first embodiment, in the second exemplary embodiment of the ceramic plate-shaped body according to the present disclosure, one principal surface and the other principal surface are not polished after firing, and concave portions are scattered on one principal surface and the other principal surface. In the second embodiment of the ceramic plate-shaped body according to the present disclosure, a SAD value is 0.009 or more and 0.128 µm or less in a region set at an arbitrary position of at least one of the one principal surface and the other principal surface. Here, when the planar area obtained by viewing the above region from the top is denoted by Sa, and the surface area obtained by measuring the above region with a scanning probe microscope is denoted by Sb, the SAD value is defined as (Sb/Sa)−1.

The above ceramic plate-shaped body also has high smoothness though one principal surface and the other principal surface are not polished after firing. As a result, damage to the ceramic laminate according to the present disclosure can be minimized because local concentration of load is suppressed even when stacked or further vibration is applied in that state.

In the method for manufacturing a ceramic plate-shaped body according to the present disclosure, the ceramic plate-shaped body is efficiently manufactured. In this manufacturing method, a ceramic plate-shaped body having a principal surface with high smoothness can be obtained without performing a polishing step after firing. In addition, the ceramic plate-shaped body according to present disclosure has high smoothness though one principal surface and the other principal surface are not polished after firing.

DETAILED DESCRIPTION OF THE EMBODIMENTS

Exemplary embodiments of the present disclosure will be shown below, and characteristics of the exemplary embodiments will be described in more detail. The exemplary embodiments of the present invention is widely applied to, for example, a ceramic plate-shaped body such as a battery cell of a solid oxide fuel cell and its manufacture.

Embodiment of Ceramic Plate-Shaped Body

First Exemplary Embodiment of Ceramic Plate-Shaped Body

A ceramic plate-shaped body 10 of a first exemplary embodiment of a ceramic plate-shaped body according to the present disclosure will be described with reference to FIGS. 1, 2A, and 2B.

Each drawing is a schematic view, and the shape of each element is exaggerated for ease of understanding. Also, variations in shape of each element occurring in the manufacturing process are not necessarily reflected in each drawing. That is, the drawings used for the explanation in this specification can be said to represent actual products in an essential aspect even when there is a part different from the actual product.

Figure 1:
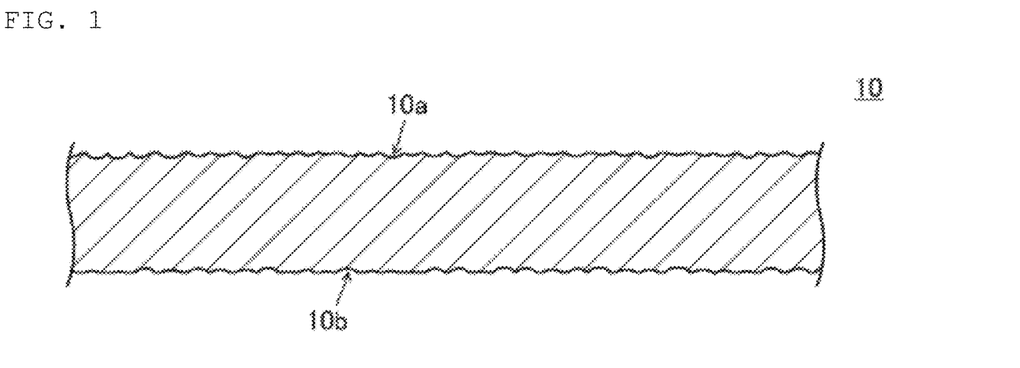
FIG. 1 is a cross-sectional view of a ceramic plate-shaped body 10 according to the present disclosure.

FIG. 1 is a cross-sectional view of a ceramic plate-shaped body 10. The ceramic plate-shaped body 10 is a sintered body of a solid electrolyte such as scandia-stabilized zirconia and yttria-stabilized zirconia, and is used for a power generation material of a battery cell of a solid oxide fuel cell. The one principal surface 10a and the other principal surface 10b of the ceramic plate-shaped body 10 are not polished after firing. Also, concave portions are scattered on the one principal surface 10a and the other principal surface 10b.

Due to the existence of the concave portions, the arithmetic average roughness is 0.023 µm or more and 0.30 µm or less in a region set to an arbitrary position of at least one of the one principal surface 10a and the other principal surface 10b. Also, an arithmetic average depth of the concave portions is 0.022 µm or more and 0.30 µm or less. A thickness of the ceramic plate-shaped body 10 is 30 µm or more and 200 µm or less.

For example, a battery cell of a solid oxide fuel cell is manufactured by stacking several ten ceramic plate-shaped bodies each having a positive electrode formed on one principal surface and a negative electrode formed on the other principal surface with a metal plate interposed therebetween. That is, when laminated, a large load is applied to the ceramic plate-shaped body located on the lower side. At that time, when the unevenness of the one principal surface and the other principal surface of the ceramic plate-shaped body is large, the load is concentrated on the convex portion, and therefore there is a possibility of breakage.

On the other hand, the ceramic plate-shaped body 10 having high smoothness as described above is hardly damaged because local concentration of load is suppressed even when stacked or further vibration is applied in that state. Therefore, a solid oxide fuel cell with high reliability can be obtained. In addition, it is not necessary to sandwich a cushioning material or the like between the ceramic plate-shaped bodies 10 at the time of storage and transportation, and therefore there is an advantage that labor and cost are not required.

In the above region, it is preferred that the arithmetic average roughness is 0.1120 μm or more and 0.2190 μm or less, and the arithmetic mean depth of the concave portion is 0.134 μm or more and 0.241 μm or less. In this case, as described later, after the ceramic laminate in which the plurality of ceramic plate-shaped bodies 10 are laminated is manufactured, splittability at the time when dividing the ceramic laminate into individual ceramic plate-shaped bodies 10 is excellent.

In the above region, it is preferred that the arithmetic average roughness is 0.0234 μm or more and 0.0710 μm or less, and the arithmetic average depth of the concave portion is 0.022 μm or more and 0.044 μm or less. In this case, the smoothness of the one principal surface 10a and the other principal surface 10b is particularly high.

Figure 2A:
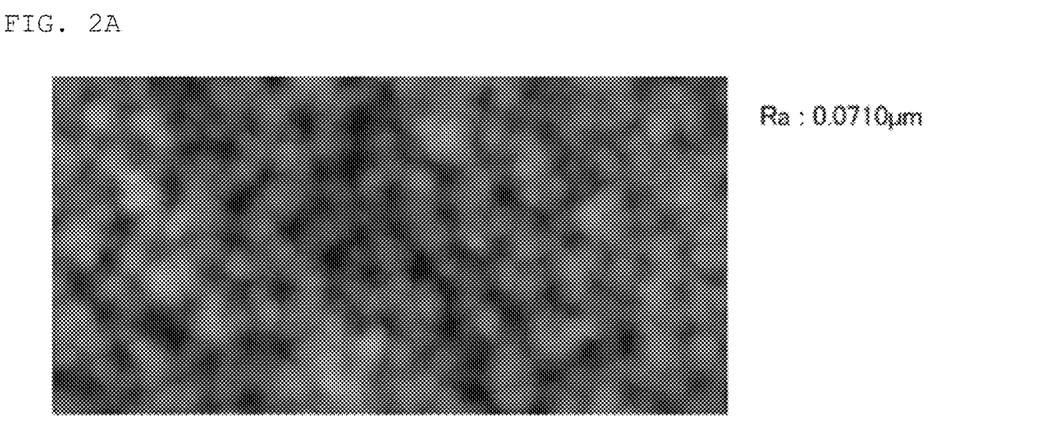
FIGS. 2A and 2B are observation images of one principal surface 10a of the ceramic plate-shaped body 10 by a scanning probe microscope.
Figure 2B:
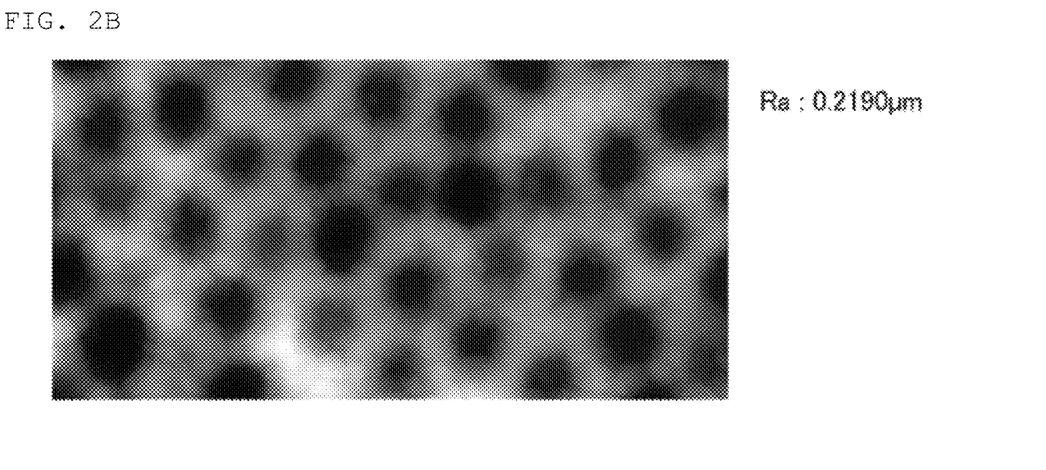

FIGS. 2A and 2B are observation images of the one principal surface 10a of the ceramic plate-shaped body 10 by a scanning probe microscope. FIG. 2A shows an observation image in the case where the arithmetic average roughness of one principal surface 10a (denoted by Ra in the drawing. The same applies hereinafter.) is 0.0710 μm, and the smoothness is particularly high. FIG. 2B is an observation image in the case where the arithmetic average roughness of one principal surface 10a is 0.2190 μm and the splittability from the ceramic laminate 10s (described later) to the individual ceramic plate-shaped body 10 is excellent.

In FIGS. 2A and 2B, a portion which looks dark shows a concave portion. The deeper the depth is, the darker the concave portion appears. That is, FIG. 2A shows that one principal surface 10a has many small shallow concave portions. On the other hand, FIG. 2B shows that one principal surface 10a has a small number of relatively large concave portions having a depth which is not enough to be smoothed by polishing. The difference in the characteristics of the above ceramic plate-shaped body 10 is derived from the difference in the form of the principal surface. The form of the principal surface is controlled by a manufacturing method described later.

Second Embodiment of Ceramic Plate-Shaped Body

Since a second embodiment of the ceramic plate-shaped body according to the present disclosure has the same structure as that of the ceramic plate-shaped body 10 shown in FIGS. 1, 2A, and 2B, illustration thereof is omitted.

As described above, the ceramic plate-shaped body of the second embodiment is also a sintered body of a solid electrolyte such as scandia-stabilized zirconia and yttria-stabilized zirconia, and is used for a power generation material of a battery cell of a solid oxide fuel cell. In addition, the one principal surface and the other principal surface of the ceramic plate-shaped body are not polished after firing as with the ceramic plate-shaped body 10 in the first embodiment, and concave portions are scattered on the one principal surface and the other principal surface.

Due to the presence of the concave portions, a SAD value is 0.009 or more and 0.128 or less in a region set in an arbitrary position of at least one of the one principal surface and the other principal surface. Here, when the planar area obtained by viewing the above region from the top is denoted by Sa, and the surface area obtained by measuring the above region with a scanning probe microscope is denoted by Sb, the SAD value is defined as (Sb/Sa)−1.

As with the ceramic plate-shaped body 10 in the first embodiment, the ceramic plate-shaped body having high smoothness as described above is hardly damaged because local concentration of load is suppressed even when stacked or further vibration is applied in that state. Therefore, a solid oxide fuel cell with high reliability can be obtained. In addition, it is not necessary to sandwich a cushioning material or the like between the ceramic plate-shaped bodies at the time of storage and transportation, and therefore additional labor and cost are advantageously not required during the manufacturing process.

Embodiment of Method for Manufacturing Ceramic Plate-Shaped Body

First Embodiment of Method for Manufacturing Ceramic Plate-Shaped Body

A first exemplary embodiment of a method for manufacturing a ceramic plate-shaped body according to the present disclosure will be described with reference to FIG. 3 and FIG. 4. FIGS. 3A to 4B are cross-sectional views schematically showing steps sequentially performed in the first exemplary embodiment of the method for manufacturing a ceramic plate-shaped body 10.

Figure 3A:
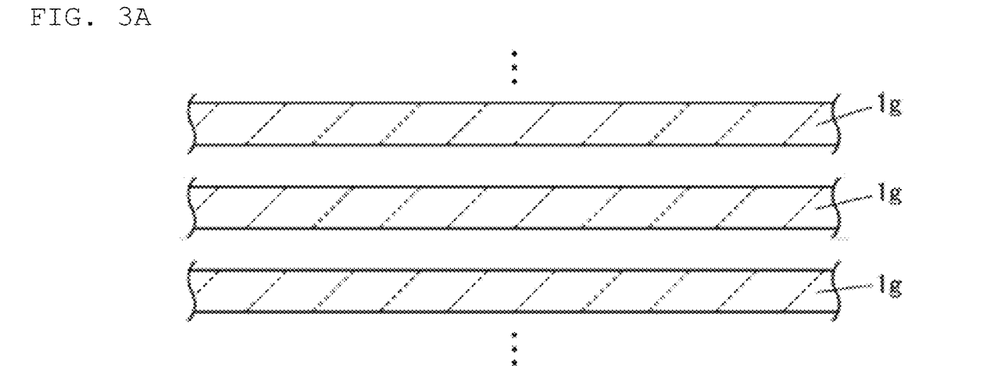
FIGS. 3A to 3D are views for illustrating a method for manufacturing a ceramic plate-shaped body 10 according to a first exemplary embodiment, and is a schematic cross-sectional view for illustrating a part of the steps (first and third steps).
Figure 4A:
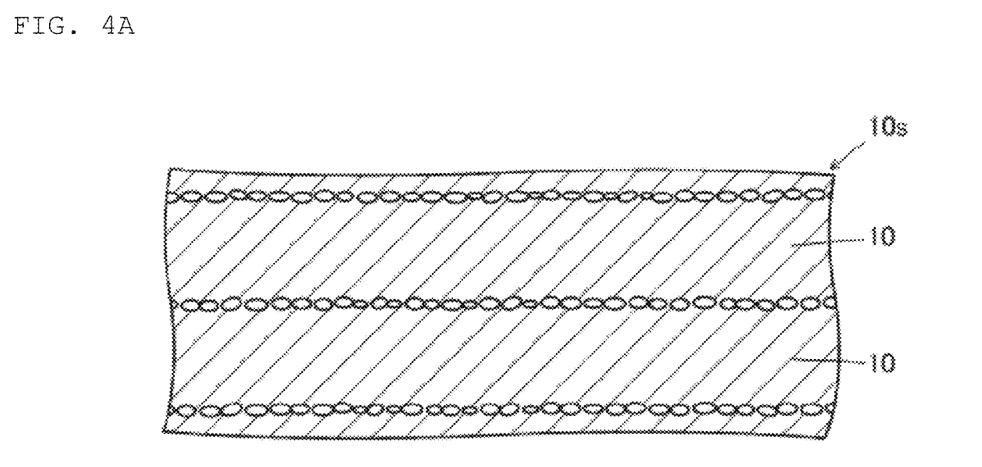
FIGS. 4A and 4B are views for illustrating the first exemplary embodiment of the method for manufacturing a ceramic plate-shaped body 10, and is a schematic cross-sectional view for illustrating steps (fourth and fifth steps) following FIGS. 3A to 3D.
Figure 4B:
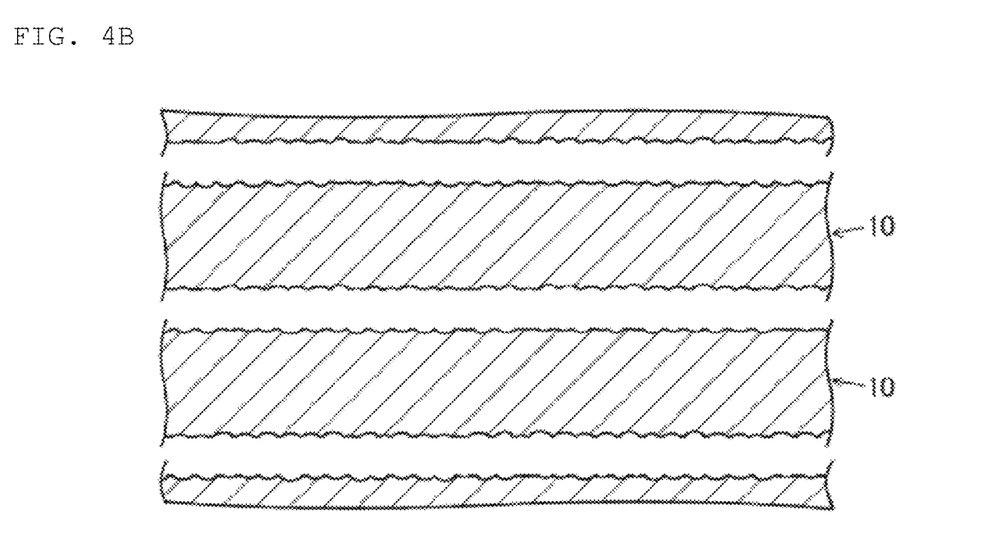

FIG. 3A is a cross-sectional view showing a step of producing or preparing the ceramic green sheet 1g. The ceramic green sheet 1g is obtained by applying a ceramic slurry formed by mixing a ceramic material powder, a binder, an additive added as required such as a dispersant, and an organic solvent onto the carrier film. When the ceramic plate-shaped body 10 is used for the power generation material of a battery cell of a solid oxide fuel cell as described above, a solid electrolyte powder such as scandia-stabilized zirconia powder and yttria-stabilized zirconia powder is used for the ceramic material powder.

Figure 3B:
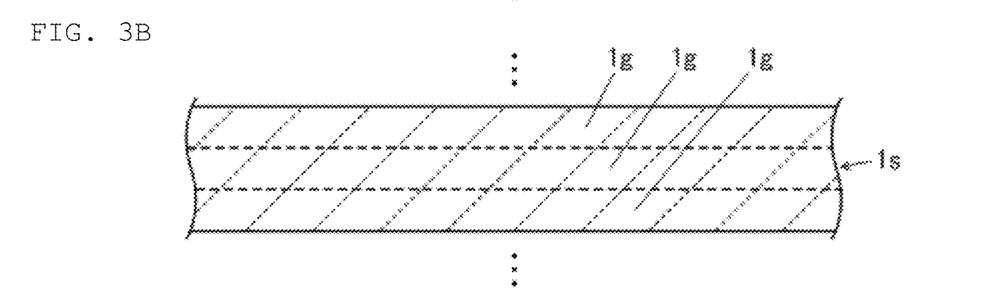

FIG. 3B is a cross-sectional view showing a step of forming green sheets 1g into an unsintered plate-shaped body 1s. In FIG. 3B, there is shown a step of producing an unsintered plate-shaped body 1s by laminating three ceramic green sheets 1g, but the number of the green sheets is not limited to this. In addition, a plurality of ceramic green sheets 1g may be simply laminated and may not be press-bonded. When the unsintered plate-shaped body 1s is formed from the plurality of ceramic green sheets 1g, a thickness of the ceramic plate-shaped body 10 can be appropriately and easily controlled. In addition, there is a case that one ceramic green sheet 1g becomes the unsintered plate-shaped body 1s. In that case, the step of FIG. 3B is omitted.

The steps shown in the cross-sectional views of FIGS. 3A and 3B are a step of producing or preparing a plurality of unsintered plate-shaped bodies is containing a ceramic material powder together (first step).

Figure 3C:
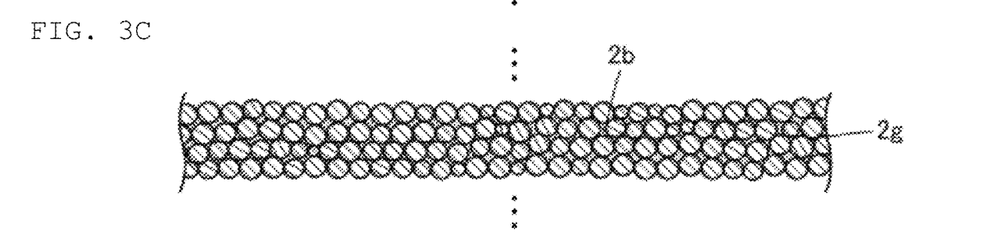

FIG. 3C is a cross-sectional view showing a step of producing or preparing a plurality of resin sheets 2g (second step). For producing or preparing each resin sheet 2g, used is a resin slurry containing an organic solvent and a spherical resin powder which is composed of a resin material being poorly-soluble in the organic solvent and burning out during firing, and which has a median diameter of 0.5 μm or more and 10 μm or less. It is noted that the execution of the first step and the execution of the second step may be performed in any order.

The median diameter is defined as a particle diameter ($D_{50}$) at which a cumulative value is 50% in a distribution curve in which, for example, the particle size distribution of the resin powder 2b is measured by a laser diffraction type particle size distribution measuring device and expressed as a cumulative % with respect to a particle diameter scale. In addition, the shape of the resin powder 2b includes distortion and the like generated in the manufacturing process, and the median diameter is an equivalent circle diameter.

The resin sheet 2g is obtained by applying a resin slurry formed by mixing a resin powder 2b, a binder, an additive added as required such as a dispersant, and an organic solvent onto the carrier film. For the resin powder 2b, a resin material poorly-soluble in the organic solvent used for preparing the resin slurry as described above is used.

For purposes of this disclosure, the phrase "poorly soluble in an organic solvent" is defined as the fact that when 100 g of the organic solvent and 0.1 g of the resin powder are mixed for 24 hours at room temperature (25° C.), there is a remained residue by visual observation. In the case where the organic solvent used for preparing the resin slurry is at least one (a single body or a mixture) selected from among toluene, ethanol, isopropanol, butyl acetate, ethyl acetate, terpineol, and water, as the material of the resin powder 2b, for example, a crosslinked acrylic resin is used according to an exemplary aspect.

A thickness of the resin sheet 2g is preferably 3 μm or more and 30 μm or less. In this case, since the thermal energy necessary for burning out the resin sheet 2g in the fourth step described later is small, the firing time can be shortened. Since a ratio of the ceramic plate-shaped body 10 contained in the fired ceramic laminate 10s can be increased, the production efficiency of the ceramic plate-shaped body 10 is increased.

The thickness of the resin sheet 2g is preferably twice or more a median diameter of the resin powder 2b. In this case, since two or more resin powders 2b overlap in the thickness direction of the resin sheet 2g (see FIG. 3D described later), a bonding area between a plurality of ceramic plate-shaped bodies 10 after firing is greatly reduced. Accordingly, the division of the ceramic laminate 10s into individual ceramic plate-shaped bodies 10 according to the fifth step described later is easily performed.

Figure 3D:
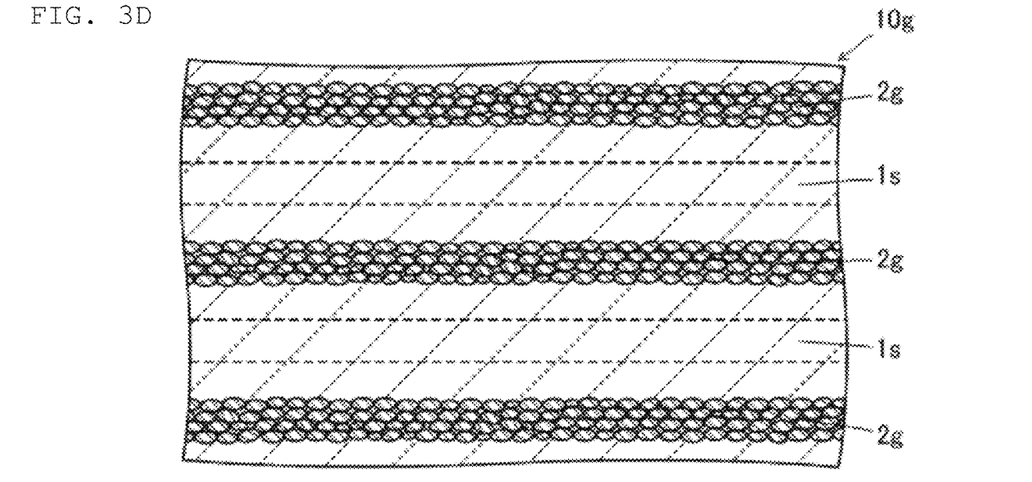

FIG. 3D is a cross-sectional view showing a step in which the unsintered plate-shaped body 1s and the resin sheet 2g are alternately laminated and press-bonded to produce unsintered laminate 10g (third step). When the unsintered plate-shaped body 1s and the resin sheet 2g are press-bonded, the spherical resin powder 2b in the resin sheet 2g is deformed to be flattened. In this state, a resin sheet 2g is pressed against one principal surface of the unsintered plate-shaped body 1s, and another resin sheet 2g is pressed against the other principal surface of the unsintered plate-shaped body 1s.

As a result, concave portions derived from the shape of the flattened resin powder 2b are formed in a scattered state on the one principal surface and the other principal surface of the unsintered plate-shaped body 1s. The form of the concave portion is controlled by the median diameter of the resin powder 2b.

FIG. 4A is a cross-sectional view showing a step of firing an unsintered laminate 10g (fourth step). Through this process, a plurality of unsintered plate-shaped bodies is are sintered to form a plurality of ceramic plate-shaped bodies 10, and the plurality of the ceramic plate-shaped bodies 10 are bonded to each other with scattered fine bonding portions interposed between the ceramic plate-shaped bodies to form a ceramic laminate 10s. In addition, the plurality of resin sheets 2g are burned out.

FIG. 4B is a cross-sectional view showing a step of breaking the above bonding portions in the ceramic laminate 10s so that the ceramic laminate 10s is divided into a plurality of ceramic plate-shaped bodies 10 (fifth step). By undergoing a process up to this step, the ceramic plate-shaped body 10 is produced.

In the above method for manufacturing a ceramic plate-shaped body 10, after the ceramic laminate 10s is manufactured, it is divided into individual ceramic plate-shaped bodies 10, and therefore the ceramic plate-shaped bodies 10 can be manufactured efficiently. In this manufacturing method, the concave portions derived from the shape of the resin powder 2b remain on the one principal surface 10a and the other principal surface 10b of the ceramic plate-shaped body 10, but since the particle size of the resin powder 2b is within the above range, the arithmetic average roughness of the both principal surfaces advantageously becomes small. Therefore, without needing to perform a polishing step after firing, a ceramic plate-shaped body 10 having a principal surface with high smoothness can be obtained.

Second Embodiment of Method for Manufacturing Ceramic Plate-Shaped Body

A second exemplary embodiment of a method for manufacturing a ceramic plate-shaped body according to the present disclosure will be described with reference to FIG. 5. As with the first embodiment, the second embodiment of the method for manufacturing a ceramic plate-shaped body also eliminates the need for a polishing step after firing.

The second exemplary embodiment of the method for manufacturing a ceramic plate-shaped body according to the present disclosure includes first to fifth steps. FIGS. 5A and 5B are schematic cross-sectional views each for illustrating steps (second and third steps) different from those of the first embodiment, in the second embodiment of the method for manufacturing a ceramic plate-shaped body 10.

Since the first step is the same as that in the first embodiment, the description thereof is omitted.

Figure 5A:
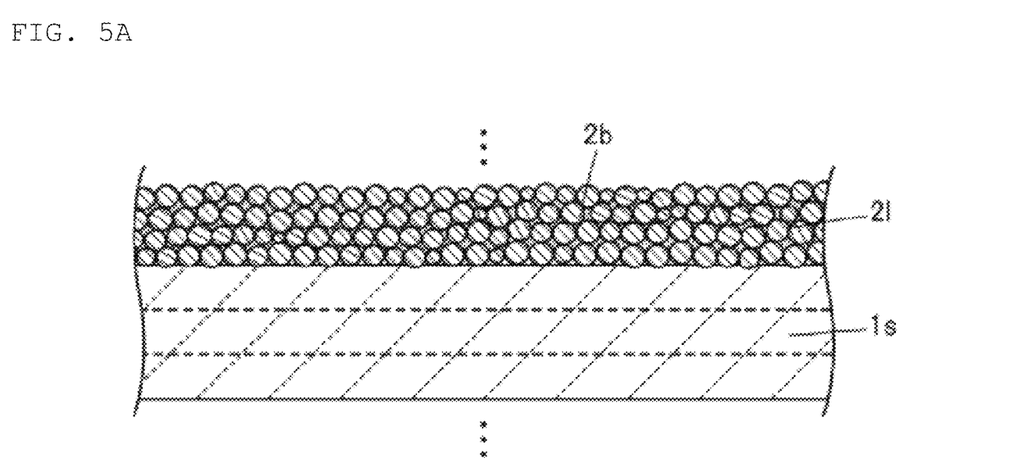
FIGS. 5A and 5B are views for illustrating a method for manufacturing a ceramic plate-shaped body 10 according to a second exemplary embodiment, and a schematic cross-sectional view for illustrating steps (second and third steps) different from those of the first embodiment.

FIG. 5A is a cross-sectional view showing a step of providing resin layers 21 containing a spherical resin powder 2b which is composed of a resin material burning out during firing, and has a median diameter of 0.5 μm or more and 10 μm or less on one principal surfaces of the plurality of unsintered plate-shaped bodies is (second step). As described above, when the unsintered plate-shaped body 1s includes a plurality of ceramic green sheets, the ceramic green sheets may be simply laminated and may not be press-bonded. In that case, providing of the resin layer 21 in the second step may be performed on the uppermost ceramic green sheet included in the unsintered plate-shaped body not press-bonded.

The providing of the resin layer 21 onto the one principal surface of the unsintered plate-shaped body 1s is performed by applying the same as the resin slurry described in the first embodiment onto the one principal surface of the unsintered plate-shaped body 1s. Properties of the resin powder 2b are also the same as those described in the first embodiment.

A thickness of the resin layer 21 is preferably 3 μm or more and 30 μm or less. In this case, since the thermal energy necessary for burning out the resin layer 21 in the fourth step (described later) is small, the firing time can be shortened. Since a ratio of the ceramic plate-shaped body 10 contained in the fired ceramic laminate 10s can be increased, the production efficiency of the ceramic plate-shaped body 10 is increased.

In addition, the thickness of the resin layer 21 is preferably twice or more the median diameter of the resin powder 2b. In this case, since two or more resin powders 2b overlap in the thickness direction of the resin layer 21 (see FIG. 5B described later), the bonding area between a plurality of ceramic plate-shaped bodies 10 after firing is greatly reduced. Accordingly, the division of the ceramic laminate 10s into individual ceramic plate-shaped bodies 10 according to the fifth step described later is easily performed.

Figure 5B:
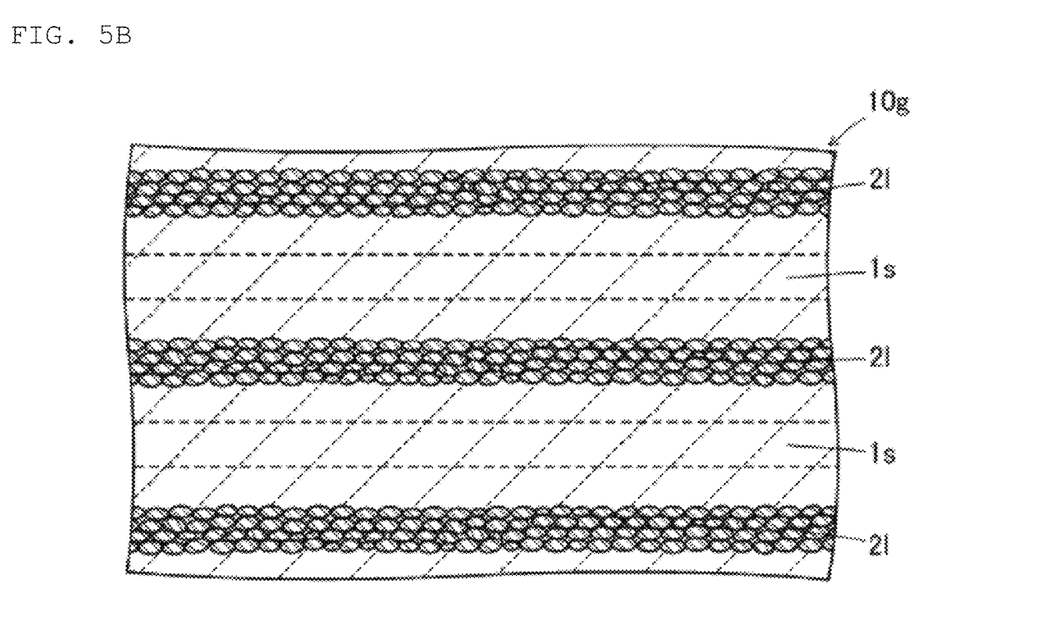

FIG. 5B is a cross-sectional view showing a step of producing an unsintered laminate 10g by laminating a plurality of unsintered plate-shaped bodies is each having a resin layer 21 provided on one principal surface and press-bonding (third step). When the plurality of unsintered plate-shaped bodies is having the resin layer 21 provided on the one principal surface are press-bonded, the resin powder 2b in the resin layer 21 is deformed to be flattened. In this state, the resin layer 21 is pressed against one principal surface of the unsintered plate-shaped body 1s, and the resin layer 21 provided on one principal surface of another unsintered plate-shaped body 1s is pressed against the other principal surface of the unsintered plate-shaped body 1s.

As a result, concave portions derived from the shape of the flattened resin powder 2b are formed in a scattered state on the one principal surface and the other principal surface of the unsintered plate-shaped body 1s, as with the first embodiment. The form of the concave portion is controlled by the median diameter of the resin powder 2b.

Since the fourth step and the fifth step are the same as those in the first embodiment, the description thereof will be omitted.

Also in the second embodiment of the method for manufacturing a ceramic plate-shaped body, the same technical effect as that of the first embodiment can advantageously be achieved. The above method for manufacturing a ceramic plate-shaped body has been described by taking, as an example, the ceramic plate-shaped body 10 which is the first embodiment of the ceramic plate-shaped body. However, it goes without saying that the second embodiment of the ceramic plate-shaped body described above can also be manufactured by the method for manufacturing a ceramic plate-shaped body according to the present invention.

EXPERIMENT EXAMPLE

The present invention will be described in more detail based on experiment examples.
<First Step>
A scandia-stabilized zirconia powder, a binder, a dispersant, and an organic solvent were compounded so as to have a predetermined ratio. The compounded product was stirred for 3 hours at 1000 rpm with a medium consisting of partially stabilized zirconia to form a ceramic slurry. As an organic solvent, a mixture composed of toluene and ethanol in proportions of 7:3 by weight was used.

This ceramic slurry was formed into a sheet on a carrier film made of polyethylene terephthalate by a known technique to obtain a ceramic green sheet as shown in FIG. 3A. The ceramic green sheet was punched by a known technique so as to have a predetermined size and peeled from the carrier film. Punching of the ceramic green sheet and peeling from the carrier film may be performed in any order.

Three ceramic green sheets peeled from the carrier film were laminated and press-bonded to form an unsintered plate-shaped body as shown in FIG. 3B.
<Second Step>
A spherical resin powder made of a crosslinked acrylic resin, a binder, a dispersant, and an organic solvent were compounded so as to have a predetermined ratio. Since the spherical resin powder has the smallest surface area per weight, the amount of a binder necessary for producing a highly fluid resin slurry is reduced. As a result, a resin sheet having a high content of resin powder is produced, and therefore the density of the concave portions on the principal surface of the ceramic plate-shaped member described later is increased. As an organic solvent, a mixture composed of toluene and ethanol in proportions of 7:3 by weight was used.

The compounded product was stirred for 3 hours at 1000 rpm with a medium consisting of partially stabilized zirconia to form a resin slurry. Six types of resin powders having median diameters of 0.3 μm, 0.5 μm, 1.0 μm, 3.0 μm, 5.0 μm, and 10.0 μm were prepared. The case where the median diameter of the resin powder was 0.3 μm was defined as the condition A. In the same manner, the cases where the median diameters of the resin powder were 0.5 μm, 1.0 μm, 3.0 μm, 5.0 μm, and 10.0 μm were defined as the conditions B, C, D, E, and F, respectively. Table 1 below summarizes various characteristic values under each of these conditions.

This resin slurry was formed into a sheet on a carrier film made of polyethylene terephthalate by a known technique to obtain a resin sheet as shown in FIG. 3C. The thickness of the resin sheet is between 10 μm and 18 after drying. The arithmetic surface roughness of the surface of the resin sheet which was not in contact with the carrier film at the time of production is shown in Table 1 below. The measuring apparatus and measurement conditions used for measuring the arithmetic surface roughness are as follows.

Measuring apparatus: Dimension Icon manufactured by Bruker AXS Pte Ltd.
Scan Rate: 0.4 Hz
Scan Line: 256×256
Measurement mode: Peak force tapping
Image processing after measurement: Planefit 2nd XY, Flatten The resin sheet was punched by a known technique so as to have a predetermined size and peeled from the carrier film. Punching of the resin sheet and peeling from the carrier film may be performed in any order.
<Third Step>
Six types of unsintered laminate as shown in FIG. 3D were produced by alternately laminating unsintered plate-shaped bodies and resin sheets of each condition and press-bonding them. In this experiment example, the unsintered laminate was produced so as to include 10 sets when a resin sheet overlaid on an unsintered plate-shaped body was set as one set. When preparing the unsintered laminate, the resin sheet was arranged also under the unsintered plate-shaped body of the lowermost layer. However, the resin sheet under this unsintered plate-shaped body of the lowermost layer is not indispensable.

<Fourth Step>

The unsintered laminate obtained in the third step was fired in a firing furnace to obtain a ceramic laminate as shown in FIG. 4A. In this experiment example, since the ceramic laminate is composed of ten ceramic plate-shaped bodies, firing one ceramic laminate means substantially firing ten ceramic plate-shaped bodies at once. Therefore, the efficiency of the charging operation into the firing furnace was significantly higher than the case where the ceramic plate-shaped bodies were individually fired one by one.

The firing step which is the fourth step has undergone the following specific sub-steps. That is, the firing step includes a degreasing step and a sintering step. The degreasing step was carried out by holding the unsintered laminate at 400° are shown in Table 1. Measurement result of the condition A is a measurement result for a sample divided by application of ultrasonic vibration. These characteristic values constitute grounds for the numerical range of each constituent element specified in the present disclosure.

In the table, $D_{50}$ represents median diameter, and Ra represents arithmetic average roughness. As described above, the SAD value is defined as (Sb/Sa)−1, which is obtained by subtracting 1 from the ratio between the planar area Sa and the surface area Sb obtained by measuring with a scanning probe microscope. "Surface" as recited in Table 1 indicates a region set at an arbitrary position of at least one of the one principal surface and the other principal surface of the resin sheet or the ceramic plate-shaped body. In addition, each characteristic value of the ceramic plate-shaped body is the same as the measuring apparatus and measurement condition used for measurement of the resin sheet.

TABLE 1

| Condition | Resin Powder $D_{50}$ (μm) | Resin Sheet Surface Ra (μm) | Ceramic Plate-shaped Body Surface Ra (μm) | Concave Portion Arithmetic Average Depth of Ceramic Plate-shaped Body (μm) | Number of Concave Portions of Ceramic Plate-shaped Body (/30 μm square) | SAD | Splittability |
|---|---|---|---|---|---|---|---|
| A | 0.3 | 0.0445 | 0.0144 | 0.018 | 1000 or more | 0.006 | X |
| B | 0.5 | 0.0718 | 0.0234 | 0.022 | 1000 or more | 0.009 | ○ |
| C | 1 | 0.2148 | 0.0710 | 0.044 | 1000 or more | 0.028 | ○ |
| D | 3 | 0.3374 | 0.1120 | 0.134 | 100 to 200 | 0.046 | ⊚ |
| E | 5 | 0.6589 | 0.2190 | 0.241 | 20 to 50 | 0.098 | ⊚ |
| F | 10 | 0.7327 | 0.2940 | 0.299 | 3 to 8 | 0.128 | ○ |

C. for a predetermined time. The sintering step was carried out by holding, at 1400° C. for 5 hours, the unsintered laminate after the degreasing step.

Since most of the resin sheet is burned out during the degreasing process, the unsintered plate-shaped bodies are brought close to each other due to their own weight and come into contact in a minute region. In the contact portion, since mutual diffusion of atoms occurs during firing, the ceramic plate-shaped bodies are bonded to each other at a part of the contact portion. However, as described above, since an area of the bonded portion is small, it is possible to divide the fired ceramic laminate into individual ceramic plate-shaped bodies.

The important point is that the concave portions formed by the resin powder have a different pattern on the principal surfaces of the two ceramic plate-shaped bodies opposed to each other with the resin sheet interposed therebetween. The reason for this is that the resin powders are irregularly arranged in layers in the resin sheet, as shown in FIG. 3D. The occurrence of irregularly patterned concave portions on opposing principal surfaces significantly reduces the contact area compared with a regular pattern. Therefore, even when the depth of the concave portion is shallow, it is easy to divide the ceramic plate-shaped body.

<Fifth Step>

The ceramic laminate obtained in the fourth step was submerged in deaerated water and divided into ten ceramic plate-shaped bodies each having a thickness of 90 by applying ultrasonic vibration for 30 seconds. In the case of condition A, even when ultrasonic vibration of the above conditions was applied to the ceramic laminate, not all of them were divided and part of the ceramic plate-shaped bodies remained bonded.

Various characteristic values of the six types of ceramic plate-shaped bodies obtained by this experiment example In Table 1, the ceramic plate-shaped body produced by using the resin powder under each condition except the condition A satisfies the numerical range of each constituent element specified according to the present invention. In the conditions B and C, the smoothness of the one principal surface and the other principal surface was particularly high. In the conditions D and E, the splittability from the ceramic laminate to the individual ceramic plate-shaped bodies was excellent.

In addition, a vibration test was conducted in which 100 ceramic plate-shaped bodies produced by using the resin powder under each condition excluding the condition A were stacked and vibrated up and down in a state of being stacked in a predetermined box. The vibration test was performed with a vibration distance (Peak to Peak) of 6 mm and a vibration frequency of 3 Hz. The results are shown in Table 2.

TABLE 2

| Condition | Vibration Test Number of Cracking (/100 samples) |
|---|---|
| A | not tested |
| B | 0/100 |
| C | 0/100 |
| D | 0/100 |
| E | 0/100 |
| F | 0/100 |

In the ceramic plate-shaped body according to the present disclosure, no cracking occurred in the above vibration test. The reason for this advantageously result is presumably that the arithmetic surface roughness after firing is 0.3 μm or less and is smooth.

It should be noted that the exemplary embodiments described in this specification are illustrative, the present invention is not limited to the above-described embodiments, and various applications and modifications may be made within the scope of the present invention.

What is claimed:

1. A method for manufacturing a ceramic plate-shaped body, the method comprising:
preparing a plurality of resin sheets using a resin slurry containing an organic solvent and a spherical resin powder composed of a resin material that is poorly-soluble in the organic solvent;
alternately laminating a plurality of unsintered plate-shaped bodies containing a ceramic material powder and the plurality of resin sheets, respectively;
press-bonding the alternately laminated unsintered plate-shaped bodies and resin sheets to produce an unsintered laminate;
firing the unsintered laminate to burn out the plurality of resin sheets, such that the plurality of unsintered plate-shaped bodies are sintered to form a plurality of ceramic plate-shaped bodies that are bonded to each other with scattered fine bonding portions interposed therebetween to form a ceramic laminate, such that each of the ceramic plate-shaped bodies are formed by the firing to have a SAD value that is between at least 0.009 and at most 0.128; and
breaking the scattered fine bonding portions in the ceramic laminate to divide the ceramic laminate into the plurality of ceramic plate-shaped bodies,
wherein the SAD value is defined as (Sb/Sa) −1, with Sa being a planar area of a region of the respective ceramic plate-shaped body and Sb being a surface area obtained by measuring the region with a scanning probe microscope.

2. The method for manufacturing a ceramic plate-shaped body according to claim 1, wherein the spherical resin powder has a median diameter of 0.5 μm or more and 10 μm or less, and wherein the spherical resin powder after compression comprises a diameter in a laminating direction of the ceramic plate-shaped bodies that is shorter than that in a direction perpendicular to the laminating direction.

3. The method for manufacturing a ceramic plate-shaped body according to claim 2, wherein each of the plurality of resin sheets has a thickness of 3 μm or more and 30 μm or less.

4. The method for manufacturing a ceramic plate-shaped body according to claim 2, wherein a thickness of each of the plurality of resin sheets is twice or more the median diameter of the spherical resin powder.

5. The method for manufacturing a ceramic plate-shaped body according to claim 1, further comprising producing each of the plurality of ceramic plate-shaped bodies with at least one principal surface having an arithmetic average roughness between 0.023 μm or more and 0.30 μm or less in a region set at an arbitrary position of the at least one principal surface.

6. The method for manufacturing a ceramic plate-shaped body according to claim 5, further comprising producing each of the plurality of ceramic plate-shaped bodies to have respective concave portions having an arithmetic average depth between 0.022 μm or more and 0.30 μm or less, wherein recesses defined by the concave portions have a diameter in a horizontal direction that is larger than a depth of the recesses.

7. The method for manufacturing a ceramic plate-shaped body according to claim 6, wherein the plurality of ceramic plate-shaped bodies are produced without a polishing step after the firing of the unsintered laminate to burn out the plurality of resin sheets.

8. The method for manufacturing a ceramic plate-shaped body according to claim 1, wherein the preparing of the plurality of resin sheets comprises providing respective resin layers on one principal surface of each of the plurality of unsintered plate-shaped bodies by using the resin slurry containing the organic solvent and the spherical resin powder.

9. The method for manufacturing a ceramic plate-shaped body according to claim 8, wherein each of the resin layers has a thickness of 3 μm or more and 30 μm or less.

10. The method for manufacturing a ceramic plate-shaped body according to claim 8, wherein the thickness of each of the plurality of resin layers is twice or more the median diameter of the spherical resin powder.

11. The method for manufacturing a ceramic plate-shaped body according to claim 1, further comprising preparing each of the plurality of unsintered plate-shaped bodies with at least one ceramic green sheet.

* * * * *